United States Patent
Ichimura

(10) Patent No.: US 10,453,472 B2
(45) Date of Patent: Oct. 22, 2019

(54) PARAMETER PREDICTION DEVICE AND PARAMETER PREDICTION METHOD FOR ACOUSTIC SIGNAL PROCESSING

(71) Applicant: Panasonic Intellectual Property Corporation of America, Torrance, CA (US)

(72) Inventor: Daijiroh Ichimura, Hyogo (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 80 days.

(21) Appl. No.: 15/713,141

(22) Filed: Sep. 22, 2017

(65) Prior Publication Data

US 2018/0090152 A1    Mar. 29, 2018

(30) Foreign Application Priority Data

Sep. 28, 2016 (JP) .................... 2016-190327
Nov. 29, 2016 (JP) .................... 2016-231867
May 12, 2017 (JP) .................... 2017-095786

(51) Int. Cl.
| | | |
|---|---|---|
| *G10L 21/0216* | (2013.01) | |
| *G10L 21/0208* | (2013.01) | |
| *G10L 21/0264* | (2013.01) | |
| *G10L 19/06* | (2013.01) | |
| *G10L 15/20* | (2006.01) | |

(52) U.S. Cl.
CPC .......... *G10L 21/0216* (2013.01); *G10L 19/06* (2013.01); *G10L 21/0208* (2013.01); *G10L 15/20* (2013.01); *G10L 21/0264* (2013.01); *G10L 2021/02082* (2013.01); *G10L 2021/02087* (2013.01); *G10L 2021/02166* (2013.01)

(58) Field of Classification Search
CPC . G10L 21/02; G10L 21/0208; G10L 21/0216; G10L 21/0264; H04R 2225/41
USPC .................................................. 704/226–227
See application file for complete search history.

(56) References Cited

U.S. PATENT DOCUMENTS 6,820,053 B1    11/2004  Ruwisch
9,197,970 B2 *  11/2015  Zhang .................... H04R 25/45
(Continued)

OTHER PUBLICATIONS

Extended European Search Report, dated Jan. 12, 2018, from the European Patent Office (EPO) for the related European Patent Application No. 17191774.3.
(Continued)

*Primary Examiner* — James S Wozniak
(74) *Attorney, Agent, or Firm* — Greenblum & Bernstein, P.L.C.

(57) ABSTRACT

A parameter prediction device includes: an environmental characteristic acquirer that acquires an environmental characteristic quantity set which quantifies one or more characteristics of a sound collection environment for an acoustic signal; a target setter that sets a target evaluation value set which provides one or more values obtained by quantifying one or more performances of processing of the acoustic signal, or one or more evaluation values of a processed acoustic signal; and a first predictor that inputs the environmental characteristic quantity set and the target evaluation value set as independent variables to a first prediction model, and predicts a control parameter set for controlling the acoustic signal processing.

8 Claims, 19 Drawing Sheets

(56) References Cited

U.S. PATENT DOCUMENTS

| | | | |
|---|---|---|---|
| 2004/0047474 A1* | 3/2004 | Vries | H04R 25/70 381/60 |
| 2007/0219784 A1* | 9/2007 | Zhang | H04R 25/505 704/200.1 |
| 2007/0237346 A1* | 10/2007 | Fichtl | H04R 25/70 381/314 |
| 2009/0147977 A1* | 6/2009 | Lamm | H04R 25/70 381/315 |
| 2010/0329471 A1* | 12/2010 | Dunn | H03G 3/32 381/57 |
| 2011/0191101 A1 | 8/2011 | Uhle et al. | |
| 2011/0202111 A1* | 8/2011 | Dillon | H04R 25/606 607/57 |
| 2013/0094669 A1* | 4/2013 | Kono | G10L 25/48 381/107 |
| 2013/0188796 A1* | 7/2013 | Kristensen | H04R 25/453 381/60 |
| 2014/0146986 A1* | 5/2014 | Ypma | H04R 25/505 381/314 |
| 2015/0172831 A1* | 6/2015 | Dittberner | H04R 25/70 381/314 |
| 2015/0380013 A1* | 12/2015 | Nongpiur | G10L 25/51 704/231 |
| 2016/0093291 A1* | 3/2016 | Kim | G10L 15/01 381/56 |
| 2016/0173049 A1* | 6/2016 | Mehta | H03G 3/32 381/57 |
| 2016/0373869 A1* | 12/2016 | Gran | H04R 25/407 |
| 2017/0118565 A1* | 4/2017 | Nielsen | H04R 25/70 |
| 2017/0127200 A1* | 5/2017 | Kuriger | H04R 25/70 |
| 2018/0007477 A1* | 1/2018 | De Vries | H04R 25/505 |
| 2018/0063654 A1* | 3/2018 | Kuriger | H04R 25/453 |
| 2018/0090152 A1* | 3/2018 | Ichimura | G10L 19/06 |

OTHER PUBLICATIONS

Tomoko Kawase et al., "Selection of Optimal Array Noise Reduction Parameter Set for Accurate Speech Recognition in Various Noisy Environments", WESPAC, 449-455, Mar. 15, 2016.

Tomoko Kawase et al., "A Study on Automated Tuning of Noise Reduction Parameter", 2016 IEICE General Conference, Dec. 6, 2015.

* cited by examiner

FIG. 6

| APPLICATION | | AMOUNT OF ECHO SUPPRESSION | TARGET EVALUATION VALUE SET ||||||| 
| | | | FULL DUPLEX PERFORMANCE | VOICE RECOGNITION RATE | FALSE DETECTION RATE | FALSE REJECTION RATE | DISTORTION RATE | AMOUNT OF NOISE SUPPRESSION | DELAY AMOUNT |
|---|---|---|---|---|---|---|---|---|---|
| VOICE OPERATION | WAKE-UP WORD | 1 | 1 | 1 | 0 | 0.5 | 0.5 | 0.5 | 0.5 |
| | OPERATION WORD | 0.5 | 1 | 1 | 0.5 | 0 | 0.5 | 0.5 | 0.5 |
| PHONE CALL | REMOTE PHONE CALL | 1 | 1 | 0 | 0.5 | 0.5 | 0 | 1 | 0.5 |
| | IN-VEHICLE PHONE CALL | 1 | 0.5 | 0.5 | 0.5 | 0.5 | 0.5 | 0.5 | 0 |

FIG. 8

| VOICE RECOGNITION RATE | AMOUNT OF SUPPRESSION | DISTORTION RATE |
|---|---|---|
| 1.0 | 1.0 | 0.0 |
| 0.99 | 0.8 | 0.1 |
| 0.98 | 0.6 | 0.2 |
| 0.97 | 0.4 | 0.3 |
| 0.96 | 0.3 | 0.4 |
| 0.95 | 0.2 | 0.5 |

FIG. 9

| VOICE RECOGNITION RATE | AMOUNT OF SUPPRESSION | DISTORTION RATE |
|---|---|---|
| 1.0 | 1.0 | 0.00 |
| 0.9 | 0.95 | 0.05 |
| 0.8 | 0.90 | 0.10 |
| 0.7 | 0.85 | 0.15 |
| 0.6 | 0.80 | 0.20 |
| 0.5 | 0.70 | 0.25 |

FIG. 12

|  | TARGET EVALUATION VALUE SET | | | PREDICTION RELIABILITY |
|---|---|---|---|---|
|  | VOICE RECOGNITION RATE | AMOUNT OF SUPPRESSION | DISTORTION RATE | |
| FIRST TIME | 1.0 | 1.0 | 0.0 | 0.95 |
| SECOND TIME | 1.0 | 0.9 | 0.1 | 0.95 |
| THIRD TIME | 0.95 | 0.9 | 0.1 | 0.95 |
| ... | ... | ... | ... | ... |
| 10TH TIME | 0.95 | 0.6 | 0.1 | 0.9 |

FIG. 18

|  | VOICE RECOGNITION RATE | AMOUNT OF SUPPRESSION | DISTORTION RATE |
|---|---|---|---|
| TARGET EVALUATION VALUE (INITIAL VALUE) | 1.0 | 1.0 | 0.0 |
| ALLOWABLE MAXIMUM VALUE | 0.9 | 1.0 | 0.4 |
| ALLOWABLE MINIMUM VALUE | 0.8 | 0.7 | 0.2 |
| TARGET EVALUATION VALUE (CORRECTED VALUE) | 0.9 | 1.0 | 0.2 |

PARAMETER PREDICTION DEVICE AND PARAMETER PREDICTION METHOD FOR ACOUSTIC SIGNAL PROCESSING

BACKGROUND

1. Technical Field

The present disclosure relates to a parameter prediction technique that predicts a control parameter set for acoustic signal processing, suitable for environment and application.

2. Description of the Related Art

In recent years, microphone devices (microphones) have spread to a wide range of fields such as electrical home appliances and in-vehicle products, and environments for usage, such as indoors and outdoors, and applications such as phone call or an operation using voice recognition have diversified. Acoustic signals from a microphone may include noise. Thus, noise is removed or suppressed by acoustic signal processing using a device such as a winner filter or an echo canceller.

In the acoustic signal processing, multiple control parameters for controlling performance, such as a coefficient or a threshold value are used. The performance of acoustic signal processing can be improved by optimizing the control parameters according to environment and application.

In the present disclosure, one or more control parameters used for acoustic signal processing are called a control parameter set. Also, values obtained by quantifying one or more performances of acoustic signal processing or one or more evaluation values of a processed acoustic signal are called an evaluation value set. Also, values obtained by quantifying one or more characteristics of a sound collection environment for an acoustic signal are called an environmental characteristic quantity set. Each of the control parameter set, the evaluation value set, and the environmental characteristic quantity set has one or more values.

In "Selection of Optimal Array Noise Reduction Parameter Set for Accurate Speech Recognition in Various Noisy Environments" by Kawase et al., WESPAC, 449-455, 2015 (hereinafter referred to as Non-Patent Literature 1), environments are classified from environmental characteristic quantity sets into several groups. In addition, a pre-optimized control parameter set is prepared for each of the classified groups to obtain a better evaluation value set. When acoustic signal processing is performed after such a preparation is made, a group is identified from an environmental characteristic quantity set corresponding to an acoustic signal to be processed. Then, a control parameter set corresponding to the identified group is selected. Like this, Non-Patent Literature 1 discloses a technique that improves the performance of acoustic signal processing based on the control parameter set prepared for each environmental group.

"A Study on Automated Tuning of Noise Reduction Parameter" by Tomoko Kawase et al., D-14-9, IEICE, 2016 (hereinafter referred to as Non-Patent Literature 2) discloses a technique that efficiently determines an optimal control parameter set for each environmental group by a genetic algorithm.

However, with the above-described techniques, an optimal control parameter set has to be prepared for each group, and a great amount of time is taken for preparation of control parameter sets. In addition, it is difficult to predict an optimal control parameter set in a sound collection environment corresponding to a vicinity of a boundary between groups.

SUMMARY

In one general aspect, the techniques disclosed here feature a parameter prediction device that predicts a control parameter set for controlling acoustic signal processing, the parameter prediction device including: an environmental characteristic acquirer that acquires an environmental characteristic quantity set which quantifies one or more characteristics of a sound collection environment for an acoustic signal; a target setter that sets a target evaluation value set which provides one or more values obtained by quantifying one or more performances of processing of the acoustic signal, or one or more evaluation values of a processed acoustic signal; and a first predictor that inputs the environmental characteristic quantity set and the target evaluation value set as independent variables to a first prediction model, and predicts a control parameter set for controlling the acoustic signal processing.

In optimization of a control parameter set for acoustic signal processing, a parameter prediction device according to the present disclosure is capable of improving an accuracy of prediction of a control parameter set and reducing a load or a time related to the optimization.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating an example of a target evaluation value set in the first embodiment;

FIG. 8 is a diagram illustrating an example of multiple target evaluation value sets used by learning in the first embodiment;

FIG. 9 is a diagram illustrating an example of multiple target evaluation value sets used by the learning in the first embodiment;

FIG. 12 is a diagram illustrating an example of a target evaluation value set and prediction reliability when setting of the target evaluation value set is repeated in the second embodiment;

FIG. 18 is a diagram illustrating an example of adjustment of target evaluation values of a voice recognition rate, an amount of suppression and a distortion rate according to the fourth embodiment;

DETAILED DESCRIPTION

Figure 1:
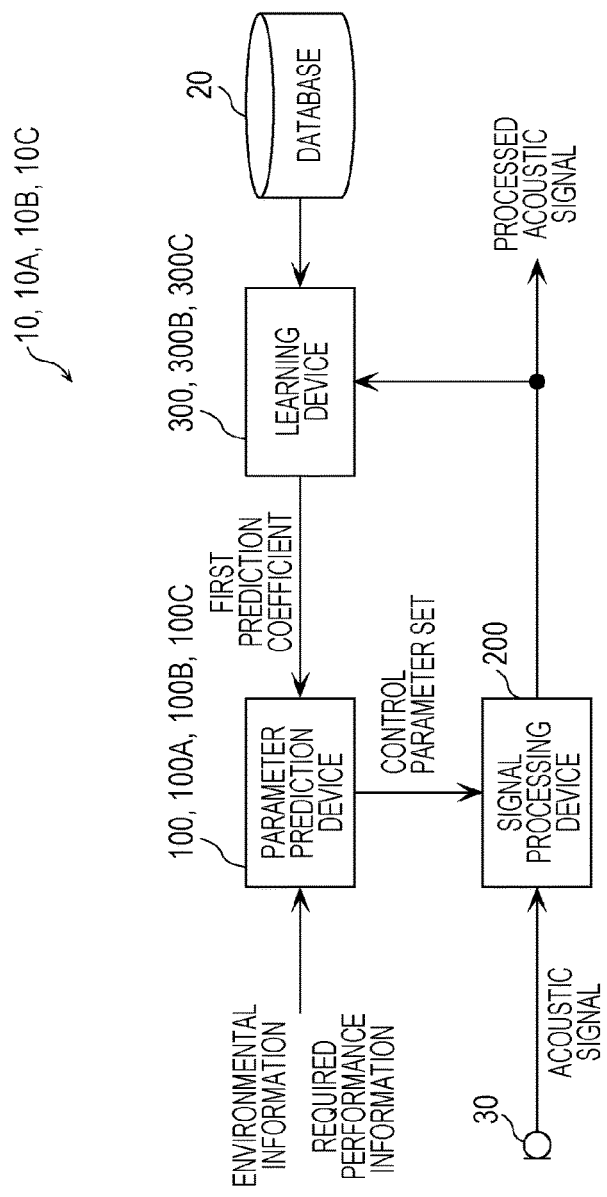
FIG. 1 is a diagram illustrating the configuration of an acoustic signal processing system according to first to fourth embodiments.

Underlying Knowledge Forming Basis of the Present Disclosure

The underlying knowledge forming the basis of the present disclosure will be described using an acoustic signal processing device including four microphones and two loudspeakers installed in an automobile as an example. The acoustic signal processing device selectively performs acoustic signal processing for a voice operation using voice recognition software, acoustic signal processing for a phone conversation with a remote party, and acoustic signal processing for a phone conversation between users on the seats in the front and back rows in a large automobile. For each of the above-mentioned acoustic signal processing, acoustic signals inputted in a handsfree state to a microphone positioned away from the mouth of a speaker, not a microphone positioned near the mouth are used.

The acoustic signal processing device includes an echo canceller and an echo suppressor for suppressing echo from loudspeaker reproduced sound returning to the microphone, and a beamformer that suppresses the ambient noise and performs directivity control in the direction of a speaker. The acoustic signal processing device outputs processed acoustic signals to a voice recognition software in a subsequent stage or a terminal of a phone call destination.

The echo canceller suppresses echo of a reproduced acoustic signal outputted from a loudspeaker and of an input acoustic signal inputted to a microphone. In general, it is difficult to completely suppress echo only by an echo canceller. It is to be noted that the distortion of an acoustic signal outputted from an echo canceller is small.

The echo suppressor suppresses the echo which cannot be suppressed by the echo canceller. However, when the amount of suppression achieved by the echo suppressor is increased, the distortion of the acoustic signal is increased. In addition, when echo is suppressed excessively, the voice of a speaker inputted simultaneously with the echo is likely to be suppressed.

The beamformer controls the directivity using four acoustic signals with suppressed echo, and suppresses the ambient noise. When the amount of suppression with respect to the ambient noise is increased, the distortion of the acoustic signal is increased.

In such an acoustic signal processing device, a control parameter set for controlling the echo canceller, the echo suppressor and the beamformer has to be optimized according to environment and application.

The performance required for acoustic signal processing varies with applications. For instance, when performing a voice operation, a speaker speaks "start voice recognition, map search". The "start voice recognition" is an wake-up word that gives an instruction for starting voice operation. The "map search" is an operation word that specifies the details of an operation.

The acoustic signal processing for a voice operation calls for a high voice recognition rate that indicates a rate of correct voice recognition, and full duplex performance that allows voice input to be received even during sound reproduction by a loudspeaker. The acoustic signal processing for a voice operation includes acoustic signal processing for an wake-up word and acoustic signal processing for an operation word. The performances requested for these two acoustic signal processing are varied.

In the acoustic signal processing for an wake-up word, a low false detection rate is important so that the ambient noise is not falsely recognized to be an wake-up word. On the other hand, in the acoustic signal processing for an operation word, a low false rejection rate is important so that the voice of a speaker is not rejected. In addition, because voice may be reproduced by a loudspeaker when an wake-up word is inputted, a high amount of suppression of echo is important in the acoustic signal processing for an wake-up word. The volume of reproduced sound of a loudspeaker can be reduced or reproduction can be stopped after an wake-up word is recognized, thus the amount of suppression of echo is not necessarily important in the acoustic signal processing for an operation word.

In addition, the acoustic signal processing for a phone conversation calls for suppression of echo. In particular, in the acoustic signal processing for a phone conversation with a remote party, a processed acoustic signal is subjectively heard by a human ear, thus a high amount of suppression of the ambient noise, a low distortion rate due to suppression, and full duplex performance are important. In addition, in the acoustic signal processing for a phone conversation in an automobile, a party is in the same space in the automobile, and thus suppression of echo is important in order to avoid howling. However, the full duplex performance is not important. In a phone conversation in an automobile, when a delay occurs between voice directly transmitted from a speaker to a party and voice transmitted to a party via acoustic signal processing, unpleasant sensation is produced. Therefore, in the acoustic signal processing for a phone conversation in an automobile, a short delay is important.

A control parameter set is optimized based on these four applications (the wake-up word, the operation word, the phone conversation with a remote party, and the phone conversation in an automobile) in consideration of environmental elements such as a vehicle speed, ON/OFF of an air conditioner, weather, the age and sex of a speaker, spaciousness of an automobile. Here, an evaluation value set, which is called for on an acoustic signal after the acoustic signal processing, is called a target evaluation value set.

In the method of Non-Patent Literatures 1 and 2, for instance, when environments are classified into 64 groups, an optimal control parameter set has to be prepared for each of the 64 groups. Also, when a control parameter set is prepared separately for each of the multiple applications, further more control parameter sets have to be prepared in advance, and thus a great amount of time is needed. Also, due to classification to discrete groups, for an environment located in the middle between adjacent groups, the accuracy of prediction of a control parameter set is reduced. Also, when the number of groups is changed or the values of a target evaluation value set are changed, an optimal control parameter set has to be prepared again.

Thus, in the present disclosure, there are provided a parameter prediction device and a parameter prediction method that, in optimization of a control parameter set for acoustic signal processing, are capable of improving the accuracy of prediction of a control parameter set and reducing a load or a time related to the optimization.

An aspect of the present disclosure provides a parameter prediction device that predicts a control parameter set for controlling acoustic signal processing, the parameter prediction device including: an environmental characteristic acquirer that acquires an environmental characteristic quantity set which quantifies one or more characteristics of a sound collection environment for an acoustic signal; a target setter that sets a target evaluation value set which provides one or more values obtained by quantifying one or more performances of processing of the acoustic signal, or one or more evaluation values of a processed acoustic signal; and a first predictor that inputs the environmental characteristic quantity set and the target evaluation value set as independent variables to a first prediction model, and predicts a control parameter set for controlling the acoustic signal processing.

With this configuration, a control parameter set can be predicted by inputting an environmental characteristic quantity set and a target evaluation value set as independent variables to the first prediction model. Therefore, a control parameter set suitable to both a sound collection environment and an application can be predicted, and the accuracy of prediction of a control parameter set can be improved. Since it is not necessary to prepare an optimal control parameter set in advance for each of environmental groups, the load or time related to the preparation for optimization of parameters can be reduced.

Hereinafter, an embodiment will be described in detail with reference to the drawings as needed. However, a detailed description more than necessary may be omitted. For instance, a detailed description of a well-known matter or a redundant description of substantially the same configuration may be omitted. This is because to avoid an unnecessary redundant description in the following and to facilitate the understanding of those skilled in the art.

It is to be noted that the accompanying drawings and the following description are provided for those skilled in the art to sufficiently understand the present disclosure, and it is not intended to limit the subject matter recited in the claims.

First Embodiment

Hereinafter, a first embodiment will be described using FIGS. 1 to 9.

[1-1. Configuration of Acoustic Signal Processing System]

[1-1-1. Entire Configuration of Acoustic Signal Processing System]

FIG. 1 is a diagram illustrating the configuration of an acoustic signal processing system 10 according to the first embodiment. The acoustic signal processing system 10 includes a parameter prediction device 100, a signal processing device 200, a learning device 300, a database 20, and a microphone 30.

The parameter prediction device 100 inputs an environmental characteristic quantity set and a target evaluation value set based on environmental information and required performance information to a first prediction model to which a first predictive coefficient received from the learning device 300 is applied, thereby predicting a control parameter set for controlling signal processing in the signal processing device 200. The parameter prediction device 100 outputs the predicted control parameter set to the signal processing device 200.

The first prediction model is a model that represents a relationship between the environmental characteristic quantity set and the target evaluation value set each serving as an independent variable (explanatory variable), and the control parameter set serving as a dependent variable (objective variable), using the first predictive coefficient. For instance, the first prediction model is a first regression model that has the environmental characteristic quantity set and the evaluation value set as independent variables, and the control parameter set as a dependent variable.

The signal processing device 200 processes an acoustic signal outputted from the microphone 30 using the control parameter set received from the parameter prediction device 100, thereby generating a processed acoustic signal. The processed acoustic signal is transmitted to, for instance, a voice recognition software or a terminal of a party of a call. Alternatively, at the time of learning, the processed acoustic signal is transmitted to the learning device 300.

The learning device 300 learns the first predictive coefficient used by the first prediction model for the parameter prediction device 100, using training data stored in the database 20. The training data includes multiple combinations of an acoustic signal and an environmental characteristic quantity set.

[1-1-2. Configuration of Parameter Prediction Device]

Figure 2:
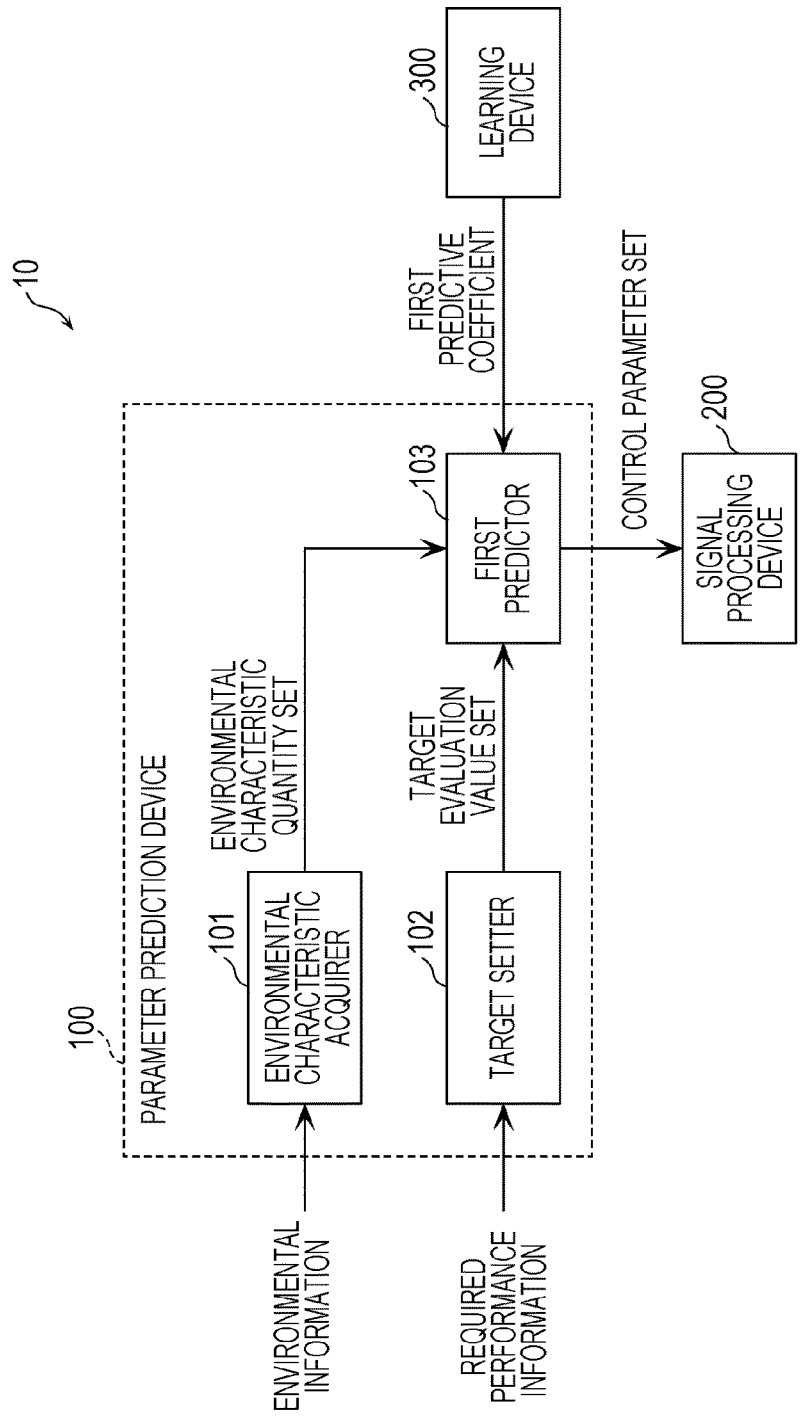
FIG. 2 is a block diagram illustrating the functional configuration of a parameter prediction device according to the first embodiment.

Here, the functional configuration of the parameter prediction device 100 will be specifically described with reference to FIG. 2. FIG. 2 is a block diagram illustrating the functional configuration of the parameter prediction device 100 according to the first embodiment.

The parameter prediction device 100 includes an environmental characteristic acquirer 101, a target setter 102, and a first predictor 103.

The environmental characteristic acquirer 101 acquires an environmental characteristic quantity set based on environmental information. The environmental information may be an environmental characteristic quantity set itself. Alternatively, the environmental information may be an acoustic signal or a video signal. Alternatively, the environmental information may be a type of an automobile or an identifier of a speaker. When the environmental information is an acoustic signal or a video signal, it is sufficient that the environmental characteristic acquirer 101 extract an environmental characteristic quantity set from the acoustic signal or the video signal.

The environmental characteristic quantity set is obtained by quantifying the environmental information. The environmental characteristic quantity set includes at least one environmental characteristic quantity. The environmental characteristic quantity represents a sound collection environment for acoustic signals. In other words, the environmental characteristic quantity represents the environment of the installation location of the microphone 30.

As a specific example, for instance, noise levels of three types of frequency bands may be used as environmental characteristic quantities. For instance, as environmental characteristic quantities, a ratio (S/N ratio) of a signal level of human voice to a noise level, the sex and age of a speaker, and the distance between or the direction to a microphone and a speaker may be used. For instance, as an environmental characteristic quantity, a value obtained by processing and quantifying an acoustic signal in any manner may be used, the acoustic signal being inputted from a microphone.

The target setter 102 sets a target evaluation value set based on the required performance information. The required performance information indicates performance such as an amount of suppression, a voice recognition rate or a distortion rate, and may be a target evaluation value set itself. In addition, the required performance information may indicate an application such as a voice operation or a phone call.

The target evaluation value set represents a target of an evaluation value of a processed acoustic signal. In this embodiment, the target evaluation value set is represented by a combination of numerical values of a voice recognition rate, an amount of suppression and a distortion rate. For instance, as a target evaluation value set, a value obtained by processing and quantifying an acoustic signal in any manner may be used, the acoustic signal having undergone the acoustic signal processing.

The first predictor 103 inputs an environmental characteristic quantity set and a target evaluation value set as independent variables to the first prediction model, and predicts a control parameter set The control parameter set includes at least one control parameter for controlling the acoustic signal processing. Specifically, the control parameter set includes, for instance, a gain of a power spectral density, an oblivion coefficient and a flooring coefficient.

The first prediction model represents a relationship between an environmental characteristic quantity set and a target evaluation value set serving as independent variables, and a control parameter set serving as a dependent variable. The predictive coefficient (parameter) of the first prediction model is prepared in advance by machine learning using training data. Specifically, as the first prediction model, for instance, a linear regression model, a support vector machine, a gaussian process regression model, or a neural network may be used.

For instance, when a regression model is used as the first prediction model, the first prediction model can be expressed by the following Expressions.

$x_i = [x_{i,1}, \ldots, x_{i,D}]^T$ $y_i = f(x_i) + \varepsilon$ (Expression 1)

In Expression 1, x indicates an independent variable, y indicates a dependent variable, and ε indicates an error. Although multiple independent variables and multiple dependent variables are used in this embodiment, for the sake of simplicity, the multiple independent variables are expressed by a D dimensional matrix, and the multiple dependent variables are expressed by a one-dimensional matrix. N pairs of an independent variable and a dependent variable are used as training data for learning, and a predictive coefficient of a regression model is learnt.

The simplest example of a regression model is a linear regression model defined by $f(xi)=W^T xi$. A predictive value f(xi) is predicted from input xi of the independent variable of the ith training data, and a predictive coefficient W is calculated so that the prediction error ε between the predictive value f(xi) and the dependent variable yi of the ith training data is reduced. However, in this embodiment, the relationship between the independent variables (the environmental characteristic quantity set and the target evaluation value set) and the dependent variable (the control parameter set) is complicated, and thus it is highly probable that the prediction error s is increased when a linear regression model is used.

Thus, for instance, a neural network may be used as the first prediction model. In a neural network, a weight (parameter) corresponds to a predictive coefficient. Also in a neural network, a predictive coefficient may be learnt by searching for a weight that reduces the error between the predictive value f(xi) and the dependent variable yi of the training data, for all the learned data using the training data.

Here, the neural network is described in detail in Rumelhart D E, Hinton G E and Williams R J: Learning internal representations by error propagation. Parallel Distributed Processing, 1, MIT Press, MA, 318-362, (1986), thus a detailed description of the neural network is omitted here.

As the first prediction model, for instance, a gaussian process regression model may be used. In a gaussian process regression model, a variance matrix K(X, X) (Expression 4) is calculated from the learned data using the average function m(x) and the variance function k (x, x') indicated by the following (Expressions 2) and (Expressions 3). A predictive coefficient $(K(X, X)+\sigma 2I)-1$ is calculated from the variance matrix K(X, X). A predictive value f* is calculated from independent variable X* using the predictive coefficient (Expression 5).

$$m(x) = E[f(x)] \quad \text{(Expression 2)}$$

$$k(x, x') = E[f(x) - m(x)(f(x') - m(x'))] \quad \text{(Expression 3)}$$

$$K(X, X) = \begin{bmatrix} k(x_1, x_1) & \ldots & k(x_1, x_n) \\ \vdots & \ddots & \vdots \\ k(x_n, x_1) & \ldots & k(x_n, x_n) \end{bmatrix} \quad \text{(Expression 4)}$$

$$\bar{f}_* = m(X_*) + K(X_*, X)(K(X, X) + \sigma^2 I)^{-1}(y - m(X))$$

$$m(X) = [m(x_1), m(x_2), \ldots, m(x_n)]$$

$$m(X_*) = [m(x_{*1}), m(x_{*2}), \ldots, m(x_{*m})]$$

$$X_* = \begin{bmatrix} x_{*1} \\ \vdots \\ x_{*m} \end{bmatrix}$$

$$K(X_*, X) = \begin{bmatrix} k(x_{*1}, x_1) & \ldots & k(x_{*1}, x_n) \\ \vdots & \ddots & \vdots \\ k(x_{*m}, x_1) & \ldots & k(x_{*m}, x_n) \end{bmatrix} \quad \text{(Expression 5)}$$

The gaussian process regression model is described in detail in C. E. Rasmussen & C. K. I. Williams, "Gaussian Processes for Machine Learning", MIT Press, 2006, thus a detailed description of the gaussian process regression model is omitted here.

[1-1-3. Configuration of Signal Processing Device]

Next, the functional configuration of the signal processing device 200 will be specifically described with reference to FIG. 3. Here, a signal processing device will be described using the acoustic signal processing for a phone call as an example. An acoustic signal transmitted from a terminal of a party destination is outputted from the loudspeaker 40, and an acoustic signal inputted from the microphone 30 is signal-processed and transmitted to the terminal of the party destination.

Figure 3:
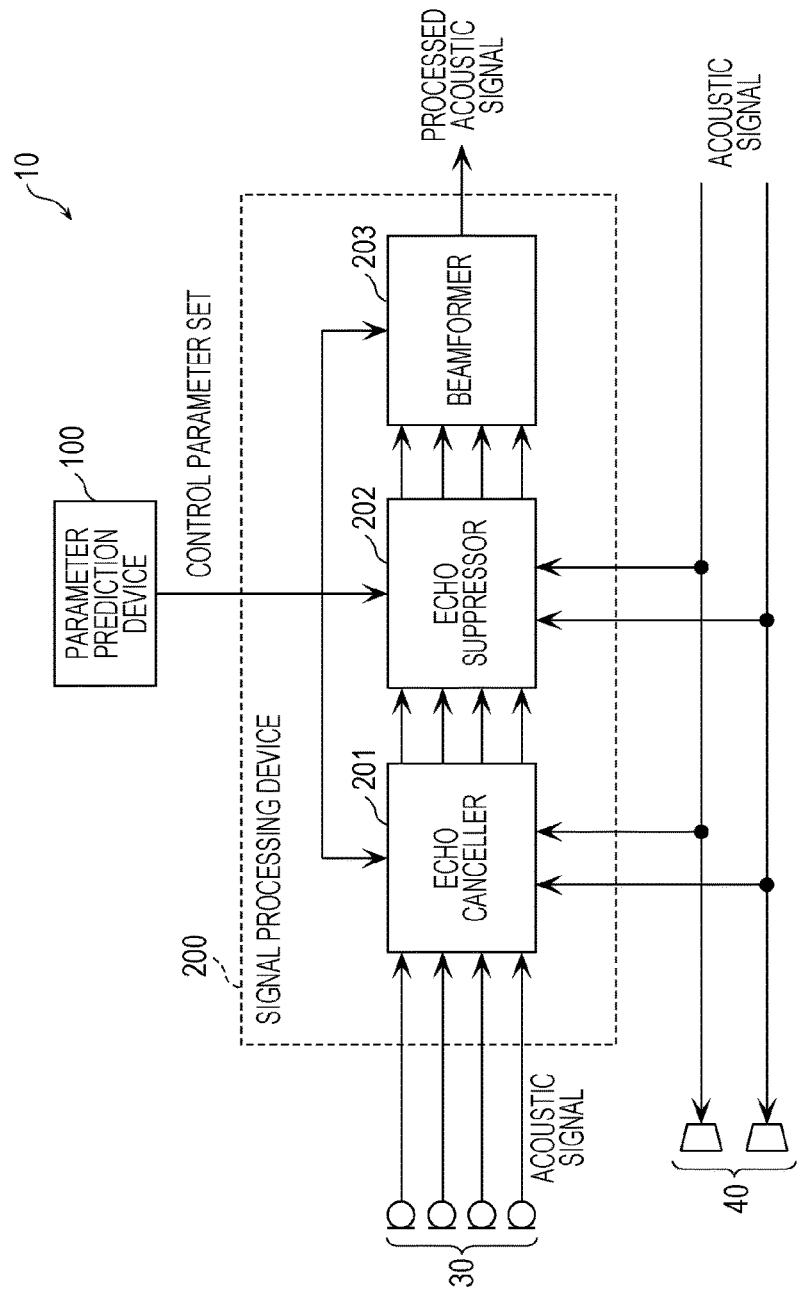
FIG. 3 is a block diagram illustrating the functional configuration of a signal processing device according to the first embodiment.

FIG. 3 is a block diagram illustrating the functional configuration of the signal processing device 200 according to the first embodiment. The signal processing device 200 includes an echo canceller 201, an echo suppressor 202, and a beamformer 203.

The echo canceller 201 eliminates echo from four acoustic signals inputted to the microphones 30 based on two acoustic signals outputted from two loudspeakers 40 and four acoustic signals inputted to the four microphones 30. At this point, the echo canceller 201 performs echo elimination processing based on a control parameter set received from the parameter prediction device 100.

The echo suppressor 202 suppresses echo which cannot be eliminated by the echo canceller 201. That is, the echo canceller 201 performs echo suppression processing on an acoustic signal, on which the echo elimination processing has been performed. At this point, the echo suppressor 202 performs the echo suppression processing based on the control parameter set received from the parameter prediction device 100.

The beamformer 203 controls the directivity using the four acoustic signals which have undergone the echo suppression processing, and eliminates the ambient noise from the acoustic signals. At this point, the beamformer 203 performs directivity control and noise elimination based on the control parameter set received from the parameter prediction device 100.

[1-1-4. Configuration of Learning Device]

In order to achieve prediction of an optimal control parameter set by the parameter prediction device 100, the first predictive coefficient applied to the first prediction model has to be prepared in advance by learning. The functional configuration of the learning device 300 to prepare for the first predictive coefficient will be specifically described with reference to FIG. 4.

Figure 4:
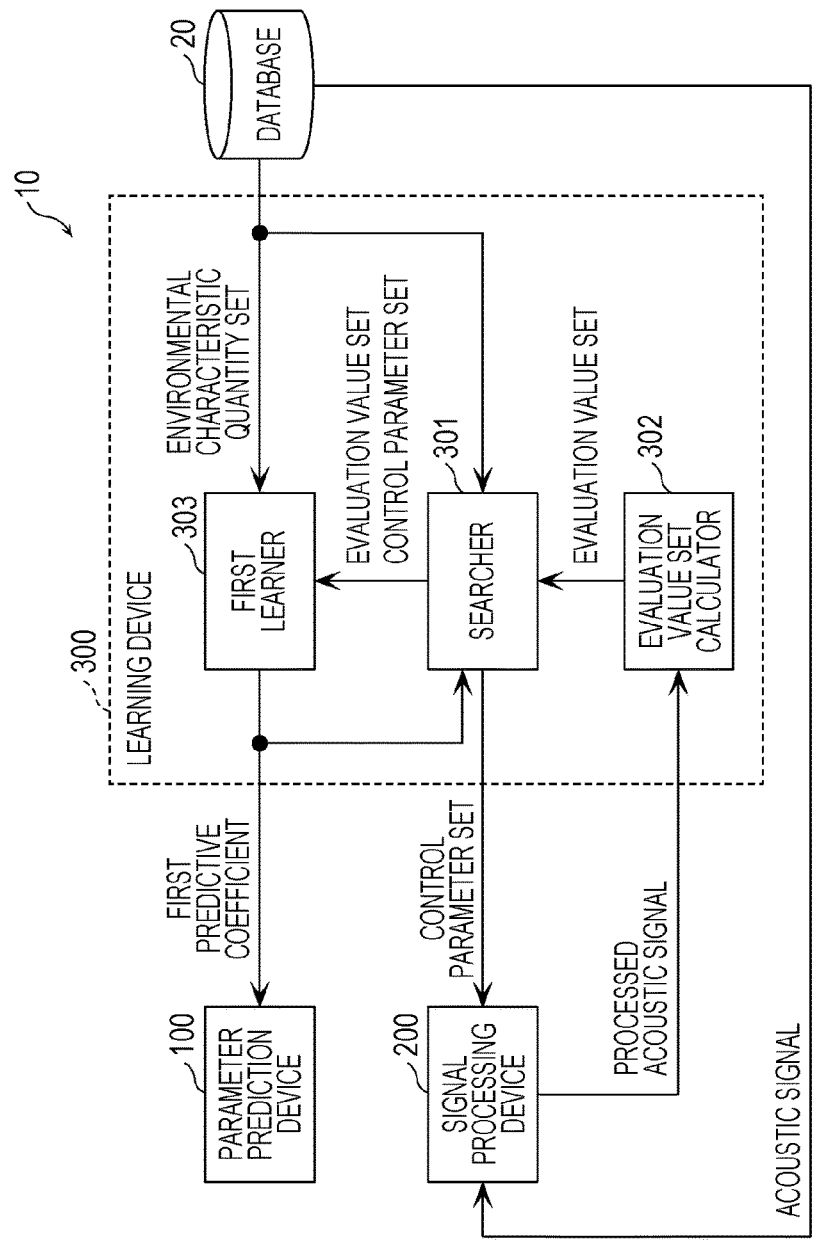
FIG. 4 is a block diagram illustrating the functional configuration of a learning device according to the first embodiment.

FIG. 4 is a block diagram illustrating the functional configuration of the learning device 300 according to the first embodiment.

The database 20 stores multiple combinations of acoustic signal data and an environmental characteristic quantity set corresponding to the acoustic signal data, as training data. The acoustic signal data indicates acoustic signals pre-recorded using the microphone 30. The environmental characteristic quantity set is acquired at the time of recording acoustic signals, or is generated at the time of storage of acoustic signals to the database 20. The database 20 may be implemented by a semiconductor memory or a hard disk drive built in the learning device 300, or may be implemented by a storage device connected to the learning device 300 via a communication network.

The signal processing device 200 obtains acoustic signal data from the database 20, and obtains a control parameter set from the learning device 300. The signal processing device 200 then processes the acoustic signal data using the control parameter set, thereby outputting the processed acoustic signal data to the learning device 300.

As illustrated in FIG. 4, the learning device 300 includes a searcher 301, an evaluation value set calculator 302, and a first learner 303.

The evaluation value set calculator 302 calculates an evaluation value set from the processed acoustic signal. The calculated evaluation value set is outputted to the searcher 301.

The first learner 303 performs regression analysis on the relationship between the environmental characteristic quantity set, the evaluation value set, and the control parameter set, thereby deriving a first predictive coefficient to be used for the first prediction model.

For each of predetermined multiple target evaluation value sets, the searcher 301 predicts a control parameter set by inputting the target evaluation value set and the environmental characteristic quantity set to the first prediction model to which the first predictive coefficient derived by the first learner 303 is applied. The searcher 301 then outputs the predicted control parameter set to the signal processing device 200. Consequently, the signal processing device 200 outputs a new processed acoustic signal to the evaluation value set calculator 302.

[1-2. Operation of Acoustic Signal Processing System]

Next, the operation of thus configured acoustic signal processing system 10 will be described.

[1-2-1. Operation of Parameter Prediction Device]

Figure 5:
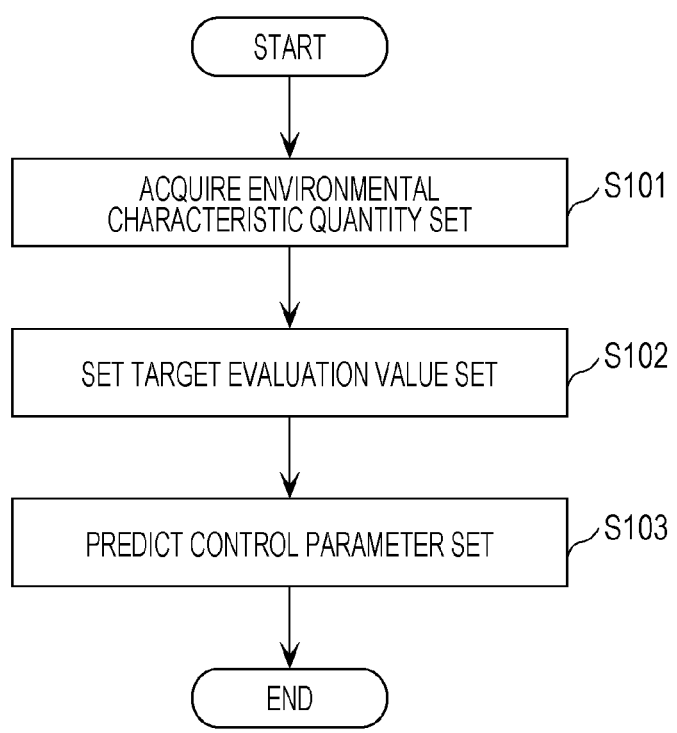
FIG. 5 is a flowchart illustrating the operation of the parameter prediction device according to the first embodiment.

FIG. 5 is a flowchart illustrating the operation of the parameter prediction device 100 according to the first embodiment.

First, the environmental characteristic acquirer 101 acquires an environmental characteristic quantity set (S101). For instance, the environmental characteristic acquirer 101 generates an environmental characteristic quantity set such as the magnitude of a noise and the fundamental frequency of the voice of a speaker from environment information such as a vehicle speed and the sex of a speaker.

The target setter 102 sets a target evaluation value set (S102). For instance, the target setter 102 generates a target evaluation value set from required performance information.

FIG. 6 is a diagram illustrating an example of a target evaluation value set in the first embodiment. In FIG. 6, application is used as the required performance information. For instance, when the required performance information indicates a voice operation and an wake-up word, a target evaluation value set is set so that an amount of echo suppression, a full duplex performance, and a voice recognition rate are high, and a false detection rate is low.

The first predictor 103 predicts a control parameter set by inputting an environmental characteristic quantity set and a target evaluation value set as independent variables to the first prediction model to which a first predictive coefficient is applied, the first predictive coefficient being a result of learning by the learning device 300 (S103).

[1-2-2. Operation of Learning Device]

Figure 7:
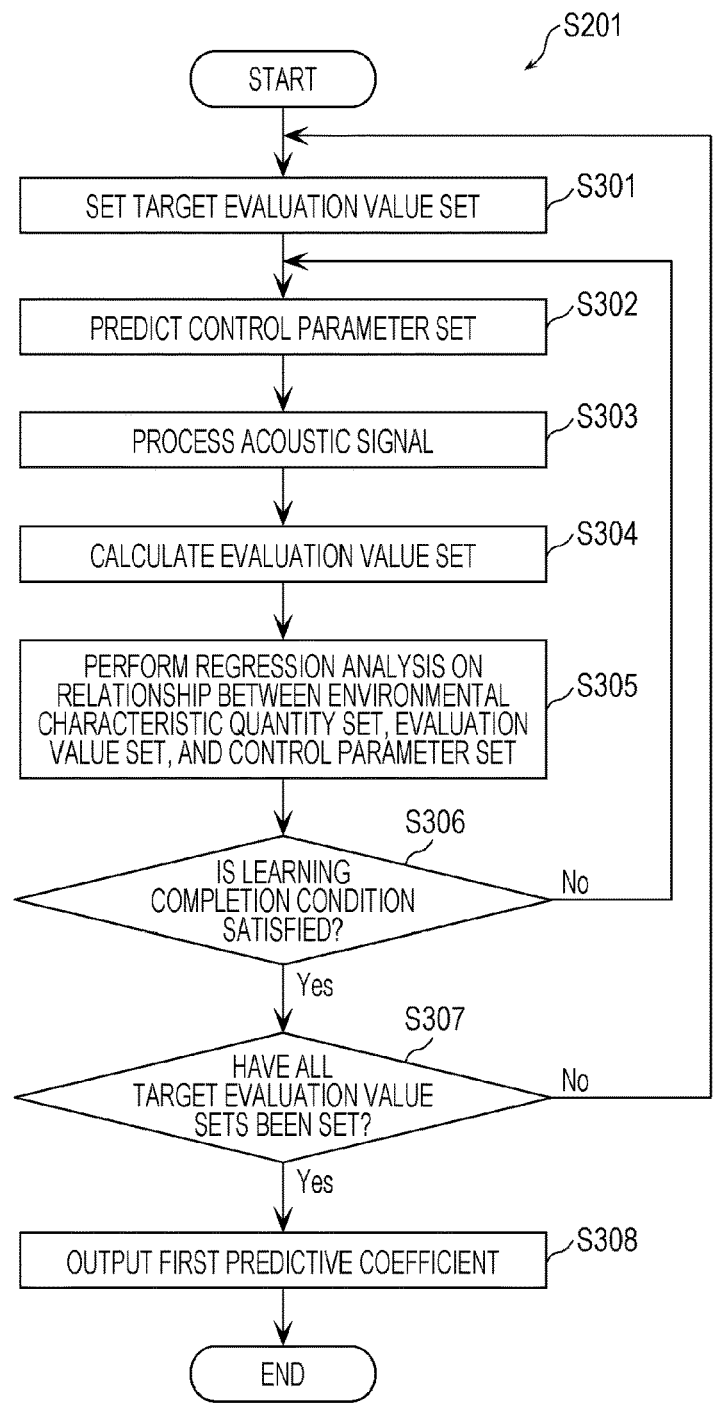
FIG. 7 is a flowchart illustrating the operation of the learning device according to the first embodiment.

Next, the operation of the learning device 300 for acquiring the first predictive coefficient of the first prediction model used for prediction of a control parameter will be described. FIG. 7 is a flowchart illustrating the operation of the learning device 300 according to the first embodiment.

First, the searcher 301 sets a target evaluation value set (S301). For instance, the searcher 301 selects one of multiple target evaluation value sets predetermined according to applications.

FIGS. 8 and 9 illustrate an example of multiple target evaluation value sets used by learning in the first embodiment. FIG. 8 illustrates multiple target evaluation value sets corresponding to a voice operation, and FIG. 9 illustrates multiple target evaluation value sets corresponding to a phone call. Here, the multiple target evaluation value sets are any combinations of six voice recognition rates, six amounts of suppression, and six distortion rates. Specifically, each of FIGS. 8 and 9 indicates 216 (=6×6×6) target evaluation value sets. In a voice operation, a first predictive coefficient suitable for prediction of a control parameter set for obtaining a high voice recognition rate is learned by setting an amount of suppression and a distortion rate in a wide range. Conversely, in the case of a phone call, a first predictive coefficient suitable for prediction of a control parameter set for obtaining a high amount of suppression and a low distortion rate is learned by setting a voice recognition rate in a wide range.

Next, the searcher 301 applies the first predictive coefficient learned by the first learner 303 to the first prediction model, and inputs the environmental characteristic quantity set included in the training data read from the database 20 and the target evaluation value set in step S301 as independent variables to the first prediction model, thereby predicting a control parameter set (S302). It is to be noted that when the first predictive coefficient is not obtainable from the first learner 303, the searcher 301 may output a predetermined initial value of the control parameter set.

The signal processing device 200 processes each acoustic signal included in the training data read from the database 20 using the control parameter set predicted by the searcher 301 (S303).

The evaluation value set calculator 302 calculates an evaluation value set of the acoustic signal processed by the signal processing device 200 (S304). The evaluation value set includes, for instance, a voice recognition rate, an amount of suppression, and a distortion rate.

The first learner 303 performs regression analysis on the relationship between an environmental characteristic quantity set read from the database 20, an evaluation value set calculated by the evaluation value set calculator 302, and a control parameter set predicted by the searcher 301, thereby deriving a first predictive coefficient (S305). In other words, the first learner 303 derives a first predictive coefficient in the first prediction model by learning the relationship between the independent variables (the environmental characteristic quantity set and the evaluation value set), and the dependent variable (the control parameter set). The derived first predictive coefficient is outputted to the searcher 301, and is used for prediction (S302) of the next control parameter set.

The first learner 303 determines whether or not a learning completion condition for the set target evaluation value set has been satisfied (S306). The learning completion condition is defined using a loop count for learning processing, for instance. In this case, when the loop count matches a predetermined count, the first learner 303 may determine that the learning completion condition is satisfied. Alternatively, for instance, the learning completion condition may be defined using the difference between the set target evaluation value set and the calculated evaluation value set. In this case, when the difference is smaller than a predetermined threshold value, the first learner 303 may determine that the learning completion condition is satisfied. Alternatively, for instance, the learning completion condition may be defined using the difference between the first predictive coefficient derived last time and the first predictive coefficient derived this time. In this case, when the difference is smaller than a predetermined threshold value, the first learner 303 may determine that the learning completion condition is satisfied.

When the learning completion condition is not satisfied (No in S306), the flow returns to step S302. When the learning completion condition is satisfied (Yes in S306), the searcher 301 determines whether or not all the target evaluation value sets have been set (S307). When one of the target evaluation value sets has not been set (No in S307), the flow returns to step S301. When all the target evaluation value sets have been set (Yes in S307), the first learner 303 outputs the first predictive coefficient, which is a result of learning, to the parameter prediction device 100 (S308).

[1-3. Effects]

As described above, with the parameter prediction device 100 according to the first embodiment, input of an environmental characteristic quantity set and a target evaluation value set as independent variables to the first prediction model allows a control parameter set to be predicted. Therefore, a control parameter set suitable to both a sound collection environment and an application can be predicted, and the accuracy of prediction of a control parameter set can be improved. Since it is not necessary to prepare an optimal control parameter set in advance for each of environmental groups, the load or time related to the preparation for optimization of parameters can be reduced.

Second Embodiment

A second embodiment differs from the first embodiment in that the accuracy of prediction of a control parameter set is improved by correcting a target evaluation value set according to a prediction reliability of the control parameter set. Hereinafter, the second embodiment, mainly the different point from the first embodiment will be specifically described with reference to FIGS. 1, 10, 11, and 12.

[2-1. Configuration of Acoustic Signal Processing System]

The configuration of an acoustic signal processing system according to the second embodiment will be described. As illustrated in FIG. 1, an acoustic signal processing system 10A includes a parameter prediction device 100A, the signal processing device 200, the learning device 300, the database 20, and the microphone 30.

[2-1-1. Configuration of Parameter Prediction Device]

Figure 10:
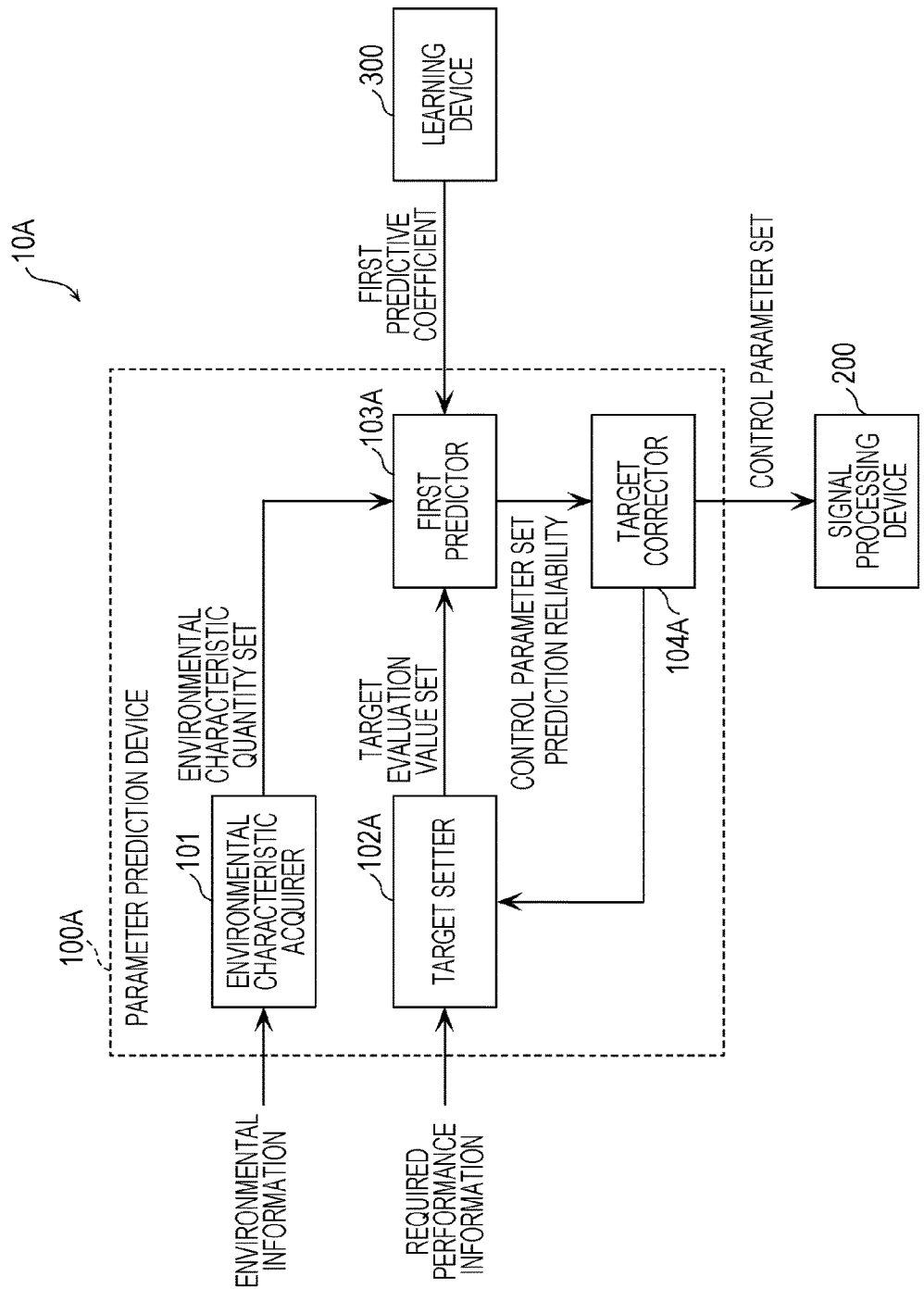
FIG. 10 is a block diagram illustrating the functional configuration of a parameter prediction device according to a second embodiment.

FIG. 10 is a block diagram illustrating the functional configuration of the parameter prediction device 100A according to the second embodiment. In FIG. 10, a component identical or similar to that of FIG. 2 is labeled with the same symbol, and a description is omitted as needed.

The parameter prediction device 100A includes the environmental characteristic acquirer 101, a target setter 102A, a first predictor 103A, and a target corrector 104A.

The first predictor 103A predicts a control parameter set and calculates a prediction reliability of the control parameter set. The prediction reliability is an index that indicates an accuracy of a predictive value in regression analysis. For instance, the prediction reliability may be a prediction error or a likelihood obtained along with a predictive value at the time of prediction in regression analysis. Alternatively, the prediction reliability may be a reciprocal of a prediction error or a likelihood. The relationship between the magnitude of the value of a prediction reliability and the level of a prediction accuracy varies depending on what is used as a prediction reliability. For instance, in some cases, the greater the value of a prediction reliability, the higher the prediction accuracy, and in the other cases, the smaller the value of a prediction reliability, the higher the prediction accuracy.

The target corrector 104A outputs a target correction instruction to the target setter 102A according to the prediction reliability of the control parameter set. For instance, when the prediction reliability is lower than a predetermined threshold reliability, the target corrector 104A outputs a target correction instruction to the target setter 102A, and when the prediction reliability is higher than the predetermined threshold reliability, the target corrector 104A outputs no target correction instruction to the target setter 102A.

When receiving a target correction instruction from the target corrector 104A, the target setter 102A sets a new target evaluation value set based on the required performance information and the currently set target evaluation value set. In short, the target setter 102A corrects a target evaluation value set according to the prediction reliability.

[2-2. Operation of Acoustic Signal Processing System]

[2-2-1. Operation of Parameter Prediction Device]

Figure 11:
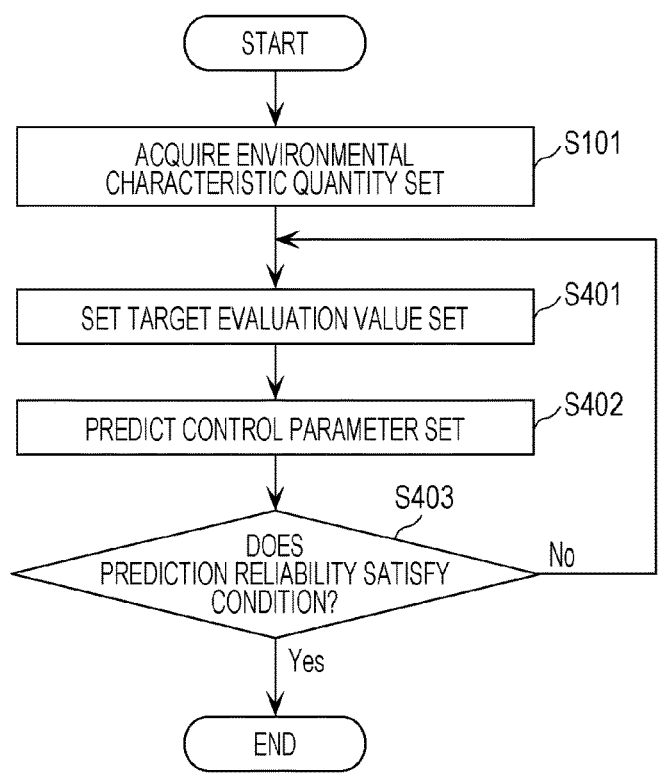
FIG. 11 is a flowchart illustrating the operation of the parameter prediction device according to the second embodiment.

Next, the operation of the parameter prediction device 100A will be described. FIG. 11 is a flowchart illustrating the operation of the parameter prediction device 100A according to the second embodiment. In FIG. 11, a step identical or similar to that of FIG. 5 is labeled with the same symbol, and a description is omitted as needed.

First, the environmental characteristic acquirer 101 acquires an environmental characteristic quantity set (S101). The target setter 102A sets a target evaluation value set (S401). The first predictor 103A predicts a control parameter set by inputting an environmental characteristic quantity set and a target evaluation value set as independent variables to the first prediction model to which a first predictive coefficient is applied, the first predictive coefficient being a result of learning by the learning device 300. At this point, the first predictor 103A also calculates a prediction reliability of the control parameter set (S402). The target corrector 104A determines whether or not the prediction reliability of the control parameter set satisfies a predetermined condition (S403). The predetermined condition is a condition that indicates the prediction reliability is sufficiently high. For instance, the target corrector 104A determines whether or not the prediction reliability is higher a threshold reliability.

Here, when the prediction reliability satisfies the condition (Yes in S403), the control parameter set is outputted to the signal processing device 200, and the processing is completed. On the other hand, when the prediction reliability does not satisfy the condition (No in S403), a target correction instruction is transmitted from the target corrector 104A to the target setter 102A, which sets a new target evaluation value set (S401). It is to be noted that in step S402, a determination may be made based on not only the prediction reliability but also a setting count (a repeat count of S401 to S403) or a processing time of a target evaluation value set. It is to be noted that the condition for the prediction reliability may be relaxed according to the repeat count.

FIG. 12 is a diagram illustrating an example of a target evaluation value set and a prediction reliability when setting of the target evaluation value set is repeated in the second embodiment. Here, in order to avoid an unnecessary redundant description and to facilitate the understanding of those skilled in the art, a voice recognition rate, an amount of suppression, a distortion rate, and a prediction reliability are expressed in terms of a normalized value (0 to 1). The target evaluation value set is corrected according to application, and in FIG. 12, the value of a voice recognition rate is slightly corrected, and the amount of suppression and the value of a distortion rate are significantly corrected according to the application of a voice operation.

During regression analysis (learning), an upper limit and a lower limit of the voice recognition rate, the amount of suppression, the distortion rate, and the prediction reliability, as well as statistical information can be obtained, and thus based on those information, the target setter 102A may determine the initial value of the target evaluation value set, or a correction step size for each target evaluation value.

Although the processing load of the regression analysis is high, the processing load of the prediction using a result (here, the first predictive coefficient) of the regression analysis is low, thus repeated prediction is achievable as in the second embodiment.

[2-3. Effects]

As described above, with the parameter prediction device 100A according to the second embodiment, a target evaluation value set can be corrected according to a prediction reliability of the control parameter set. Therefore, when prediction of a control parameter set suitable for a target evaluation value set is difficult, the target evaluation value set can be corrected and it is possible to predict a control parameter set suitable for the corrected target evaluation value set. In other words, it is possible to reduce the possibility of outputting a processed acoustic signal having an evaluation value set significantly deviated from a target evaluation value set, and thus the accuracy of prediction of a control parameter set can be improved.

Third Embodiment

In a third embodiment, multiple evaluation value sets for multiple control parameter set candidates are predicted using a second prediction model. Then, a control parameter set is selected from the multiple control parameter set candidates based on the predicted multiple evaluation value sets. Consequently, a parameter prediction device according to the third embodiment can select a control parameter set which can satisfy the required performance (the target evaluation value set).

Hereinafter, the third embodiment, mainly the different point from the first embodiment will be specifically described with reference to FIGS. 1, 13, 14, 15, and 16.

[3-1. Configuration of Acoustic Signal Processing System]

The configuration of the acoustic signal processing system according to the third embodiment will be described. As illustrated in FIG. 1, an acoustic signal processing system 10B includes a parameter prediction device 100B, the signal processing device 200, a learning device 300B, the database 20, and the microphone 30.

The parameter prediction device 100B predicts a control parameter set by inputting an environmental characteristic quantity set and a target evaluation value set as independent variables to the first prediction model. In addition, the parameter prediction device 100B generates multiple control parameter set candidates from the predicted control parameter set. Each of the generated multiple control parameter set candidates along with the environmental characteristic quantity set is inputted to the second prediction model, and an evaluation value set corresponding to each candidate is predicted.

The learning device 300B performs regression analysis on the relationship between an environmental characteristic quantity set, a target evaluation value set, and a control parameter set using the training data stored in the database 20, thereby deriving a first predictive coefficient of the first prediction model.

[3-1-1. Configuration of Parameter Prediction Device]

Figure 13:
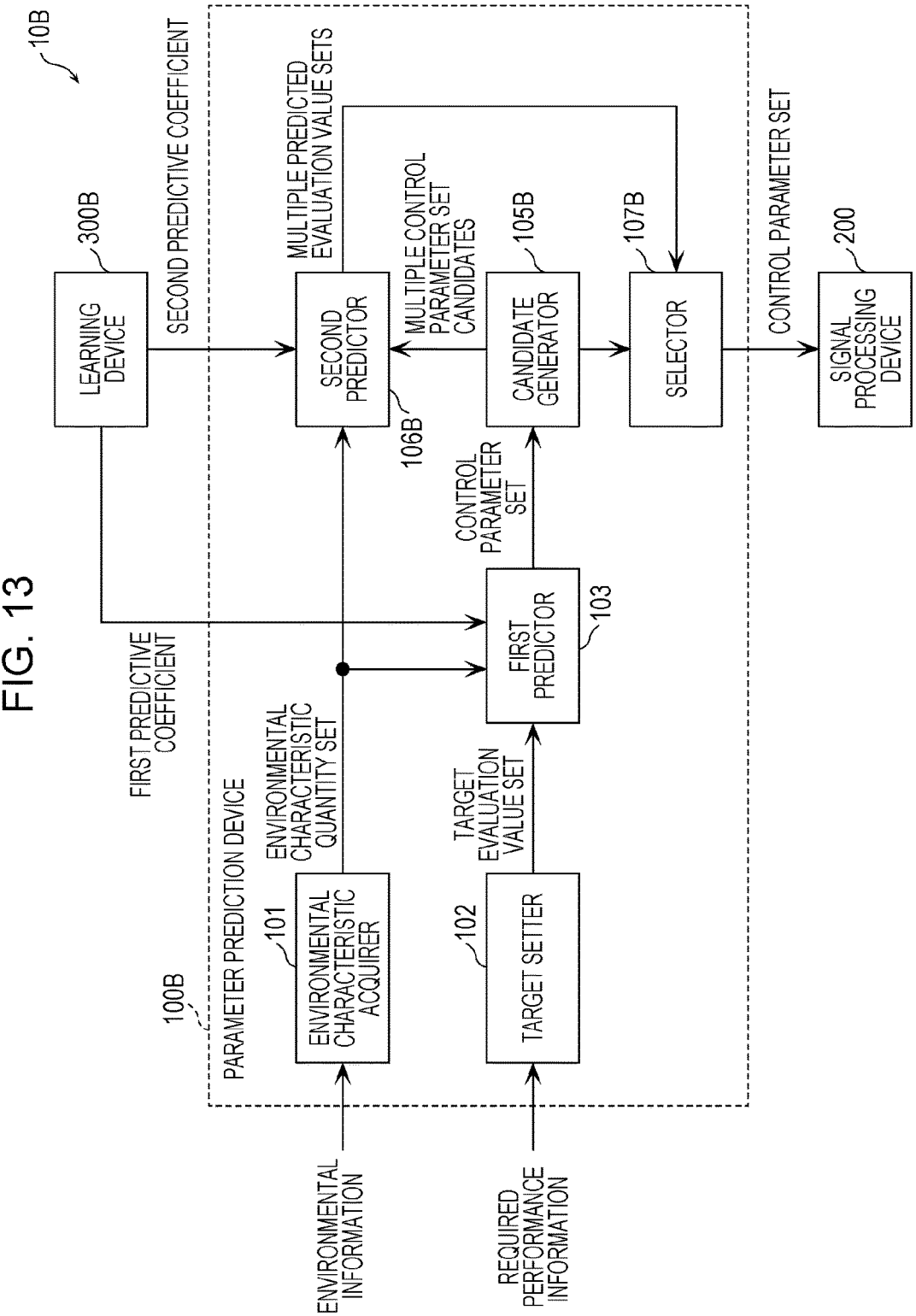
FIG. 13 is a block diagram illustrating the functional configuration of a parameter prediction device according to a third embodiment.

FIG. 13 is a block diagram illustrating the functional configuration of the parameter prediction device 100B according to the third embodiment. In FIG. 13, a component identical or similar to that of FIG. 2 is labeled with the same symbol, and a description is omitted as needed.

The parameter prediction device 100A includes the environmental characteristic acquirer 101, the target setter 102, the first predictor 103, a candidate generator 105B, a second predictor 106B, and a selector 107B.

The candidate generator 105B generates multiple control parameter set candidates based on the control parameter set predicted by the first predictor 103. Specifically, the candidate generator 105B calculates a predictive lower limit, a predictive average value, and a predictive upper limit of each control parameter, for instance, based on the predicted value and the prediction reliability of the control parameter set. The candidate generator 105B generates multiple control parameter set candidates by combining control parameters that satisfy the predictive lower limit, the predictive average value, and the predictive upper limit. It is to be noted that the candidate generator 105B may calculate a predictive lower limit, a predictive average value, and a predictive upper limit by assigning a value of a certain ratio (for instance, ±5%) to the predicted value of the control parameter set without using the prediction reliability.

The second predictor 106B predicts multiple predicted evaluation value sets by inputting an environmental characteristic quantity set and each of the multiple control parameter set candidates as independent variables to the second prediction model to which a second predictive coefficient is applied.

The second prediction model is a model that represents a relationship between the environmental characteristic quantity set and the control parameter set each serving as an independent variable (explanatory variable), and the evaluation value set serving as a dependent variable (objective variable), using the second predictive coefficient. For instance, the second prediction model is a second regression model that has the environmental characteristic quantity set and the control parameter set as independent variables, and the evaluation value set as a dependent variable. The first prediction model and the second prediction model have the environmental characteristic quantity set as an independent variable, however, between the first prediction model and the second prediction model, the control parameter set and the evaluation value set reversely correspond to an independent variable and a dependent variable.

The selector 107B selects one control parameter set from multiple control parameter set candidates based on the multiple evaluation value sets. Specifically, the selector 107B selects a control parameter set corresponding to an evaluation value set most similar to a target evaluation value set, for instance, from the multiple control parameter set candidates. Alternatively, for instance, the selector 107B selects a control parameter set corresponding to an evaluation value set higher than a target evaluation value set, from the multiple control parameter set candidates.

[3-1-2. Configuration of Learning Device]

Figure 14:
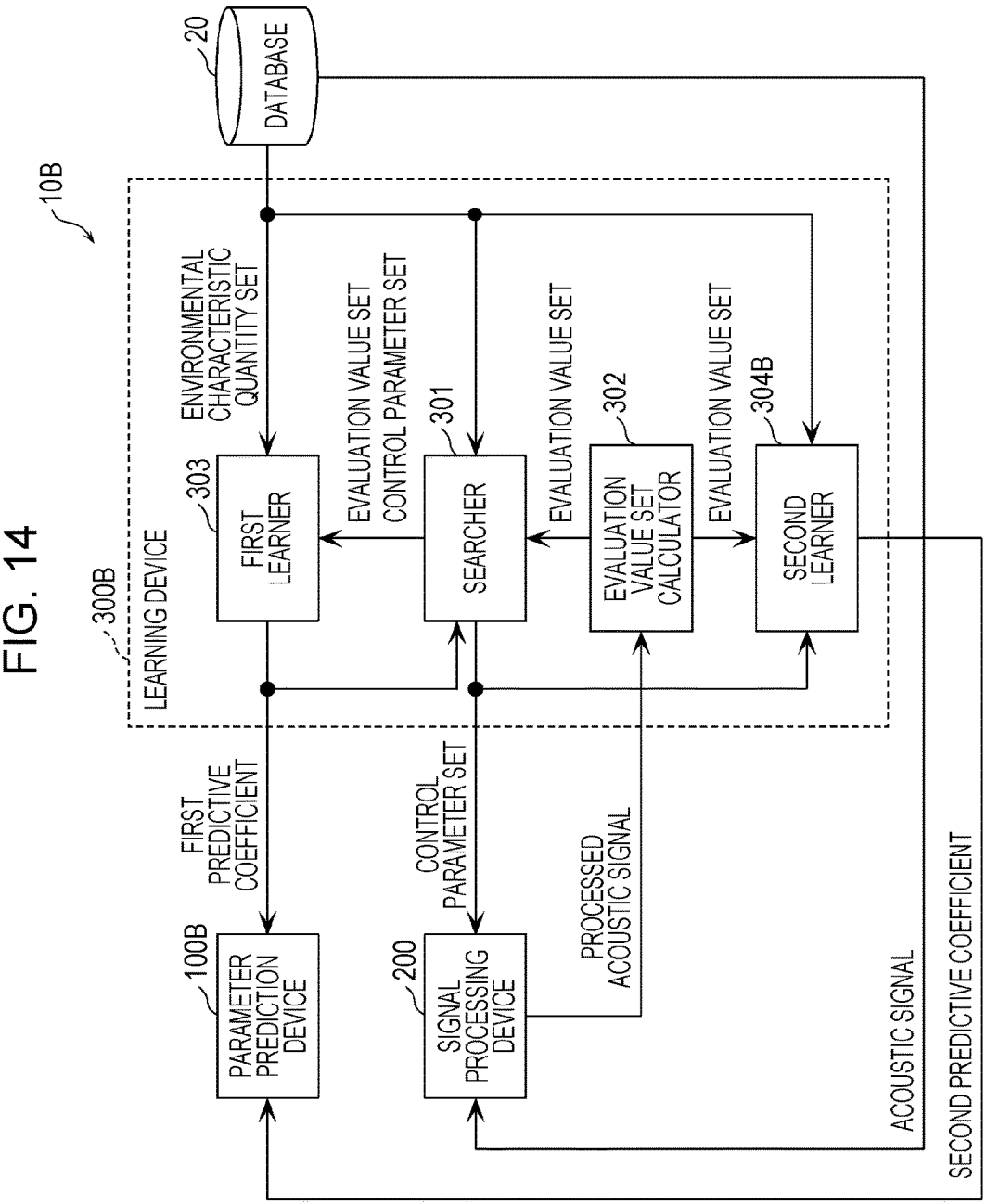
FIG. 14 is a block diagram illustrating the functional configuration of a learning device according to the third embodiment.

FIG. 14 is a block diagram illustrating the functional configuration of the learning device 300B according to the third embodiment. In FIG. 14, a component identical or similar to that of FIG. 4 is labeled with the same symbol, and a description is omitted as needed.

The learning device 300B includes the searcher 301, the evaluation value set calculator 302, the first learner 303, and a second learner 304B.

The second learner 304B performs regression analysis on the relationship between an environmental characteristic quantity set, a control parameter set, and an evaluation value set, thereby deriving a second predictive coefficient to be used for the second prediction model. The derived second predictive coefficient is outputted to the parameter prediction device 100B.

[3-2. Operation of Acoustic Signal Processing System]

[3-2-1. Operation of Parameter Prediction Device]

Figure 15:
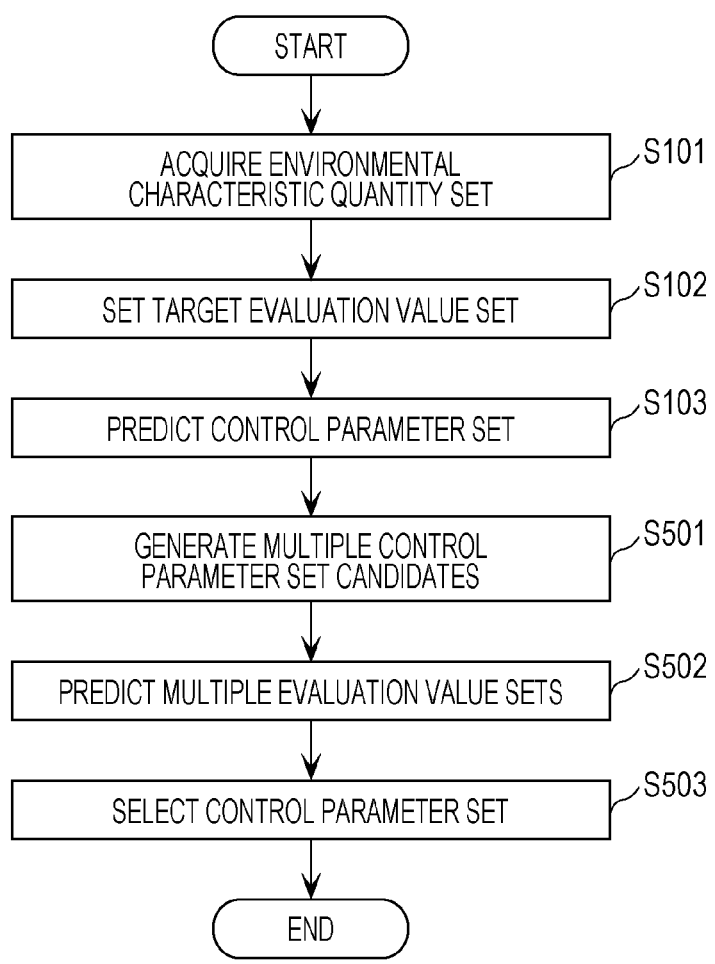
FIG. 15 is a flowchart illustrating the operation of the parameter prediction device according to the third embodiment.

Next, the operation of the parameter prediction device 100B will be specifically described with reference to FIG. 15. FIG. 15 is a flowchart illustrating the operation of the parameter prediction device 100B according to the third embodiment. In FIG. 15, a step identical or similar to that of FIG. 5 is labeled with the same symbol, and a description is omitted as needed.

After steps S101 to S103 are performed, the candidate generator 105B generates multiple control parameter set candidates based on the control parameter set predicted by the first predictor 103 (S501). For each of the multiple control parameter set candidates, the second predictor 106B predicts an evaluation value set by inputting the candidate and the environmental characteristic quantity set as independent variables to the second prediction model to which a second predictive coefficient is applied, the second predictive coefficient being a result of learning by the learning device 300B (S502).

The selector 107B selects a control parameter set from the multiple control parameter set candidates based on the predicted multiple evaluation value sets (S503). The selected control parameter set is outputted to the signal processing device 200.

[3-2-2. Operation of Learning Device]

Figure 16:
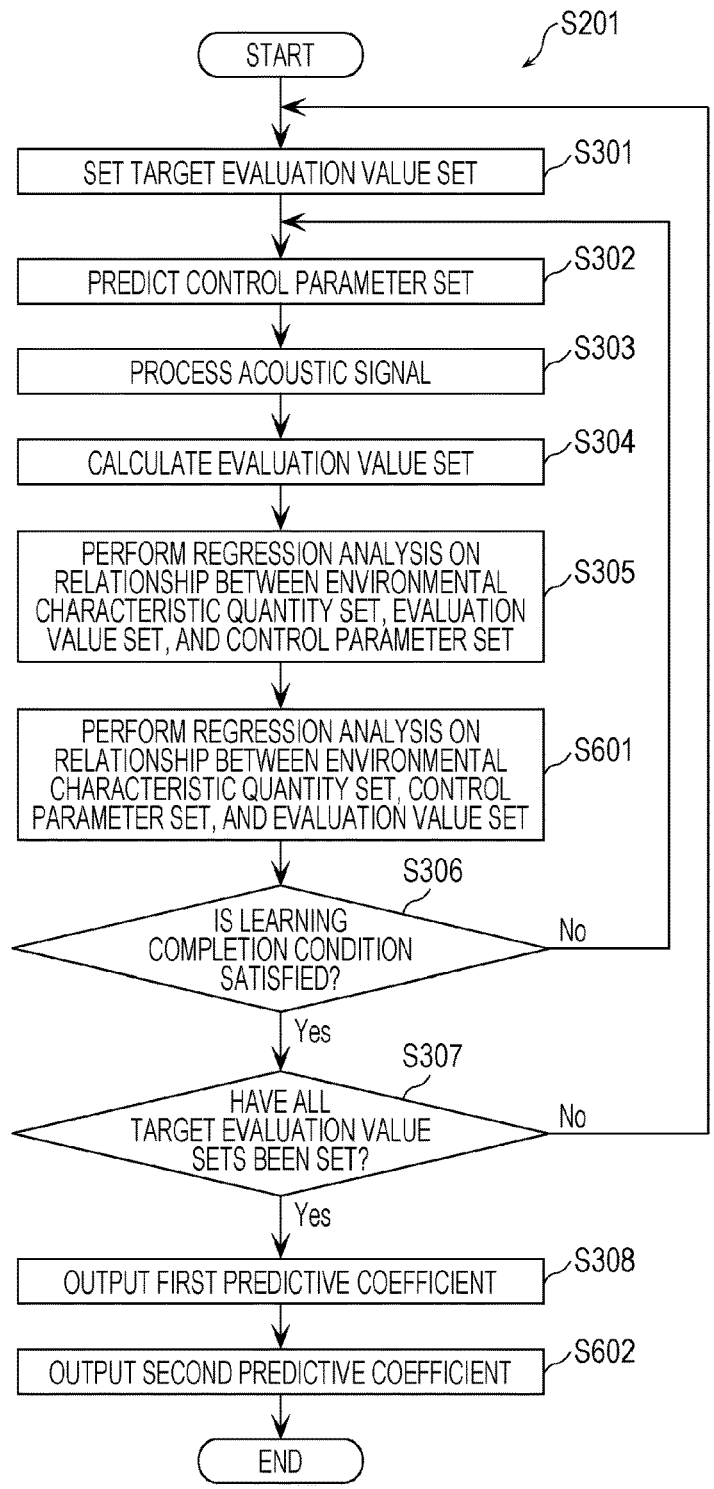
FIG. 16 is a flowchart illustrating the operation of the learning device according to the third embodiment.

Next, the operation of the learning device 300B will be specifically described with reference to FIG. 16. FIG. 16 is a flowchart illustrating the operation of the learning device 300B according to the third embodiment. In FIG. 16, a step identical or similar to that of FIG. 7 is labeled with the same symbol, and a description is omitted as needed.

After steps S301 to S305 are performed, the second learner 304B performs regression analysis on the relationship between an environmental characteristic quantity set read from the database 20, a control parameter set predicted by the searcher 301, and an evaluation value set calculated by the evaluation value set calculator 302, thereby deriving a second predictive coefficient (S601). In other words, the second learner 304B derives a second predictive coefficient in the second prediction model by learning the relationship between the independent variables (the environmental characteristic quantity set and the control parameter set), and the dependent variable (the evaluation value set).

Subsequently, after steps S306 to S308 are performed, the second learner 304B outputs the second predictive coefficient which is a result of learning, to the parameter prediction device 100B (S602).

[3-3. Effects]

As described above, with the parameter prediction device 100B according to the third embodiment, multiple evaluation value sets for multiple control parameter set candidates can be predicted using the second prediction model. A control parameter set can be selected from the multiple control parameter set candidates based on the predicted multiple evaluation value sets. Therefore, it is possible to provide the signal processing device 200 with a control parameter set that satisfies the required performance (the target evaluation value set).

Fourth Embodiment

In a fourth embodiment, a target evaluation value set is adjusted using an environmental characteristic quantity set. A recognition rate is lower in a high noise environment than in a low noise environment. Also, in a low noise environment, it is difficult to set a control parameter set that indicates a low recognition rate. According to the fourth embodiment, it is possible to adjust unpractical required performance information such as request of a high recognition rate in a high noise environment, or request of a low recognition rate in a low noise environment, and thus the accuracy of prediction of a control parameter set can be improved.

Hereinafter, the fourth embodiment, mainly the different point from the first embodiment will be specifically described with reference to FIGS. 1, 17, 18, and 19.

[4-1. Configuration of Acoustic Signal Processing System]

The configuration of the acoustic signal processing system according to the fourth embodiment will be described. As illustrated in FIG. 1, an acoustic signal processing system 10C includes a parameter prediction device 100C, the signal processing device 200, a learning device 300C, the database 20, and the microphone 30.

[4-1-1. Configuration of Parameter Prediction Device]

Figure 17:
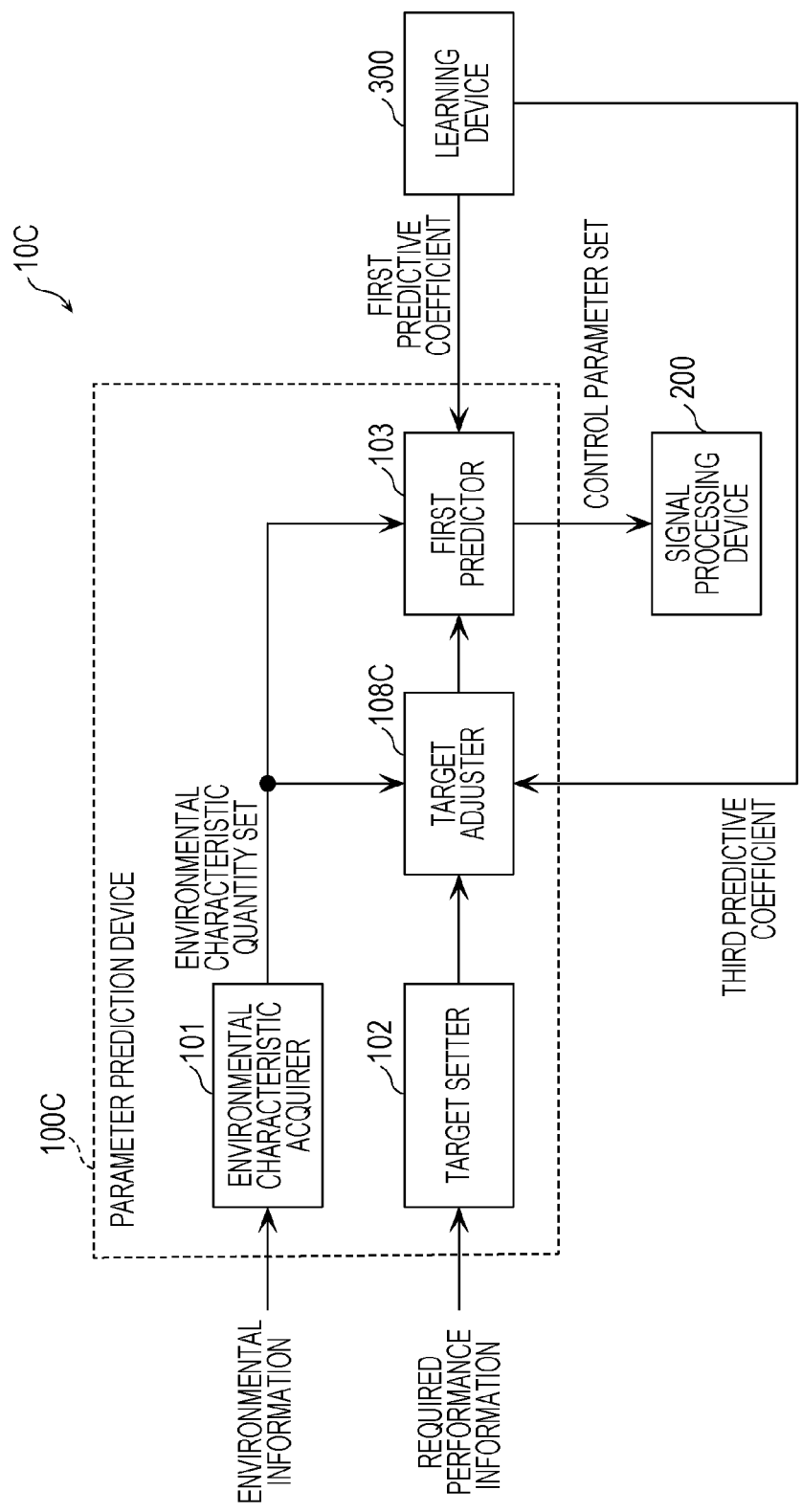
FIG. 17 is a block diagram illustrating the functional configuration of a parameter prediction device according to a fourth embodiment.

FIG. 17 is a block diagram illustrating the functional configuration of the parameter prediction device 100C according to the fourth embodiment. In FIG. 17, a component identical or similar to that of FIG. 2 is labeled with the same symbol, and a description is omitted as needed.

The parameter prediction device 100C includes the environmental characteristic acquirer 101, the target setter 102, the first predictor 103, and a target adjuster 108C.

The target adjuster 108C adjusts the target evaluation value set which is set by the target setter 102. For instance, the target adjuster 108C predicts an evaluation value set by inputting an environmental characteristic quantity set as an independent variable to a third prediction model. The target adjuster 108C adjusts the target evaluation value set based on the predictive variance in the prediction.

The third prediction model is a model that represents a relationship between the environmental characteristic quantity set serving as an independent variable (explanatory variable), and the evaluation value set serving as a dependent variable (objective variable), using the third predictive coefficient. For instance, the third prediction model is a third regression model that has the environmental characteristic quantity set as an independent variable, and the evaluation value set as a dependent variable. The third predictive coefficient may be derived in advance by the learning device 300C.

For instance, the target adjuster 108C determines an allowable maximum value and an allowable minimum value of each target evaluation value included in the target evaluation value set using a predictive variance obtained when an evaluation value set is predicted. When any target evaluation value included in the target evaluation value set obtained from the target setter 102 deviates from a range defined by the allowable maximum value and the allowable minimum value, the target adjuster 108C makes adjustment so that the target evaluation value falls within the range. For instance, when a target evaluation value included in the target evaluation value set is greater than the allowable maximum value, the target adjuster 108C adjusts the target evaluation value to the allowable maximum value. For instance, when a target evaluation value included in the target evaluation value set is smaller than the allowable minimum value, the target adjuster 108C adjusts the target evaluation value to the allowable minimum value.

FIG. 18 is a diagram illustrating an example of adjustment of target evaluation values of the voice recognition rate, the amount of suppression and the distortion rate. As illustrated in FIG. 18, the target evaluation value of the voice recognition rate is greater than the allowable maximum value, thus the target evaluation value is adjusted to the allowable maximum value. Also, the target evaluation value of the distortion rate is smaller than the allowable minimum value, thus the target evaluation value is adjusted to the allowable minimum value.

It is to be noted that the target adjuster 108C does not have to necessarily predict an evaluation value set using the third prediction model. For instance, instead of the third predictive coefficient, the target adjuster 108C may obtain the allowable maximum value and the allowable minimum value of each target evaluation value from the learning device 300C.

[4-1-2. Configuration of Learning Device]

Figure 19:
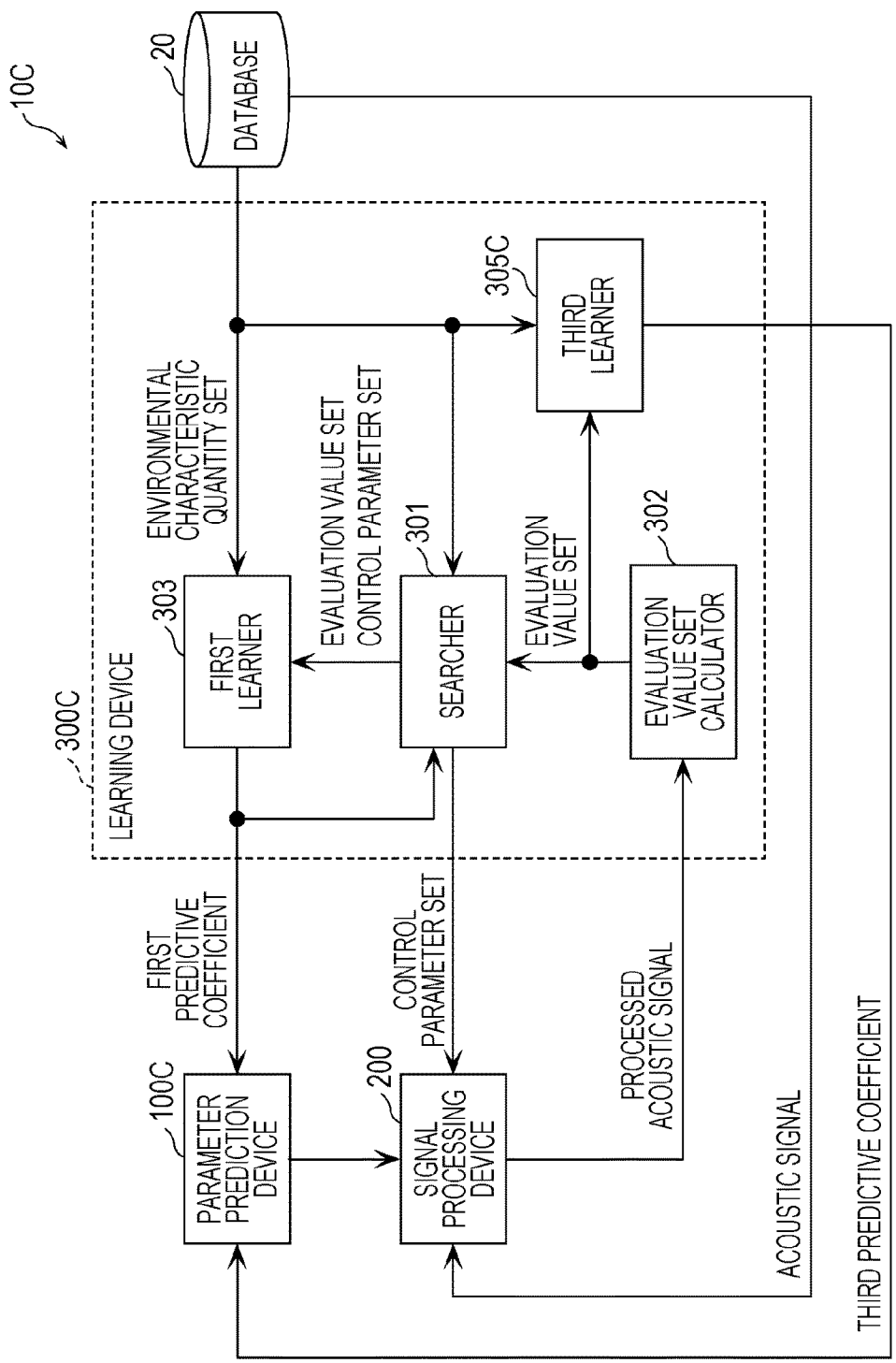
FIG. 19 is a block diagram illustrating the functional configuration of a learning device according to the fourth embodiment.

FIG. 19 is a block diagram illustrating the functional configuration of the learning device 300C according to the fourth embodiment. In FIG. 19, a component identical or similar to that of FIG. 4 is labeled with the same symbol, and a description is omitted as needed.

The learning device 300C includes the searcher 301, the evaluation value set calculator 302, the first learner 303, and a third learner 305C.

The third learner 305C obtains an environmental characteristic quantity set from the database 20, and obtains an evaluation value set from the evaluation value set calculator 302. The third learner 305C performs regression analysis on the environmental characteristic quantity set serving as an independent variable and the evaluation value set serving as a dependent variable, thereby deriving a third predictive coefficient to be used for the third prediction model. The derived third predictive coefficient is outputted to the parameter prediction device 100C.

[4-2. Operation of Acoustic Signal Processing System]

[4-2-1. Operation of Parameter Prediction Device]

Figure 20:
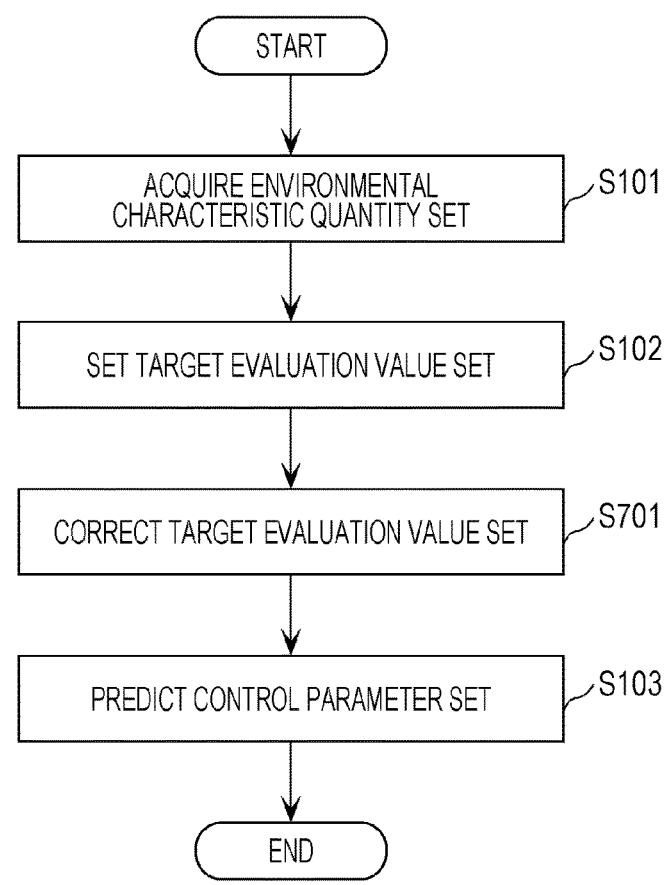
FIG. 20 is a flowchart illustrating the operation of the parameter prediction device according to the fourth embodiment.

Next, the operation of the parameter prediction device 100C will be specifically described with reference to FIG. 20. FIG. 20 is a flowchart illustrating the operation of the parameter prediction device 100C according to the fourth embodiment. In FIG. 20, a step identical or similar to that of FIG. 5 is labeled with the same symbol, and a description is omitted as needed.

After steps S101 and S102 are performed, the target adjuster 108C adjusts a target evaluation value set which is set by the target setter 102 (S701). The first predictor 103 then predicts a control parameter set using the adjusted target evaluation value set (S103).

[4-3. Effects]

As described above, with the parameter prediction device 100C according to the fourth embodiment, an evaluation value set can be predicted by inputting an environmental characteristic quantity set as an independent variable to the third prediction model, and the target evaluation value set can be adjusted. Therefore, the target evaluation value set can be adjusted to suit the sound collection environment, and the accuracy of prediction of a control parameter set can be improved.

Other Embodiments

Although the acoustic signal processing system according to one or more aspects of the present disclosure has been described based on the embodiments so far, the present disclosure is not limited to the embodiments. An embodiment to which various modifications which occur to those skilled in the art are made, and an embodiment constructed by a combination of components of different embodiments, not departing from the spirit of the present disclosure may also be included in a range of one or more aspects of the present disclosure.

For instance, the second embodiment and the third embodiment may be combined and implemented.

It is to be noted that the acoustic signal processing system in each of the embodiments may be implemented as one device, or may be implemented as two devices, each of which is any combination of the parameter prediction device, the learning device, and the signal processing device. For instance, the signal processing device may be implemented by an information terminals such as a smartphone, and the parameter prediction device and the learning device may be implemented by a cloud server. Alternatively, the parameter prediction device, the learning device, and the signal processing device may be connected to each other via a communication network.

In the embodiments, a linear regression model, a neural network, and a gaussian process regression model have been described as examples of the first prediction model and the second prediction model. However, without being limited to this, one or both of the first prediction model and the second prediction model may be a support vector machine, for instance.

Also, part or all of the components included in the parameter prediction device in each of the embodiments may be configured of one system LSI (Large Scale Integration). For instance, the parameter prediction device 100 may be configured of a system LSI having the environmental characteristic acquirer 101, the target setter 102, and the first predictor 103.

The system LSI is a super-multifunctional LSI which is manufactured by integrating multiple constituent elements on one piece of chip. Specifically, the system LSI is a computer system including a microprocessor, a read only memory (ROM), and a random access memory (RAM). A computer program is stored in the ROM. The system LSI achieves its function by the operation of the microprocessor in accordance with the computer program.

Here, the system LSI is mentioned, but which may be referred to as an IC, an LSI, a super LSI, or an ultra LSI depending on the degree of integration. Also, the technique for circuit integration is not limited to the LSI, and the circuit integration may be implemented with a dedicated circuit or a general-purpose processor. After an LSI is manufactured, a field programmable gate array (FPGA) which is programmable or a reconfigurable processor which allows reconfiguration of connection and setting of circuit cells inside the LSI may be utilized.

Furthermore, in the case where new technology of circuit integration which replaces the LSI is invented due to the progress of semiconductor technology or other emerging technologies, functional blocks may be naturally integrated using the new technology. Application of biotechnology may have such potential. An aspect of the present disclosure may provide not only such a parameter prediction device, but also a parameter prediction method including steps corresponding to characteristic components included in the parameter prediction device. Also, an aspect of the present disclosure may provide a computer program that causes a computer to execute characteristic steps included in the parameter prediction method. In addition, an aspect of the present disclosure may provide a non-transitory computer-readable recording medium on which such a computer program is recorded.

In the embodiments, each component may be formed by dedicated hardware, or may be achieved by executing a software program suitable for the component. Each component may be achieved by reading and executing a software program recorded on a recording medium such as a hard disk or a semiconductor memory by a program executor such as a CPU or a processor. Here, software, which implements the parameter prediction device in the embodiments, is the program as follows.

Specifically, the program is a parameter prediction method that causes a computer to predict a control parameter set for controlling acoustic signal processing, the method including: acquiring an environmental characteristic quantity set which quantifies one or more characteristics of a sound collection environment for an acoustic signal; setting a target evaluation value set which includes a value obtained by quantifying one or more performances of processing of the acoustic signal, or one or more evaluation values of a processed acoustic signal; and inputting the environmental characteristic quantity set and the target evaluation value set as independent variables to a first prediction model, and predicting the control parameter set.

The present disclosure is applicable to a control parameter prediction device capable of providing an optimal control parameter set most suitable to the environment and application for signal processing of an acoustic signal outputted from a microphone mounted on a home electrical appliance, an automobile, a smartphone, or a wearable terminal.

What is claimed is:

1. A parameter prediction device, comprising:
   an environmental characteristic acquirer that acquires an environmental characteristic quantity set, which quantifies one or more characteristics of a sound collection environment for an acoustic signal;
   a target setter that sets a target evaluation value set, which provides one or more values obtained by quantifying one or more performances of processing of the acoustic signal, or one or more evaluation values of a processed acoustic signal;
   a first predictor that inputs the environmental characteristic quantity set and the target evaluation value set as independent variables to a first prediction model, and predicts a control parameter set for controlling acoustic signal processing;
   a candidate generator that generates a plurality of control parameter set candidates based on the control parameter set predicted by the first predictor;
   an evaluation value set predictor that, for each of the plurality of control parameter set candidates, inputs the environmental characteristic quantity set and the candidate as independent variables to a second prediction model, and predicts an evaluation value set; and
   a selector that selects a control parameter set from the plurality of control parameter set candidates based on a plurality of evaluation value sets predicted by the evaluation value set predictor,
   wherein at least one of the environmental characteristic acquirer, the target setter, the first predictor, the candidate generator, the evaluation value set predictor, and the selector includes a processor.

2. The parameter prediction device according to claim 1, wherein the first predictor further calculates a prediction reliability of the control parameter set, the target setter corrects the target evaluation value set according to the prediction reliability, and when the target evaluation value set is corrected, the first predictor predicts the control parameter set using the corrected target evaluation value set.

3. The parameter prediction device according to claim 1, wherein the first prediction model is a first regression model that has the environmental characteristic quantity set and the evaluation value set as independent variables, and the control parameter set as a dependent variable.

4. The parameter prediction device according to claim 1, wherein the second prediction model is a second regression model that has the environmental characteristic quantity set and the control parameter set as independent variables, and the evaluation value set as a dependent variable.

5. The parameter prediction device according to claim 1, further comprising:

a target adjuster that adjusts the target evaluation value set which is set by the target setter, based on the environmental characteristic quantity set, wherein the first predictor predicts the control parameter set using the target evaluation value set adjusted by the target adjuster.

6. The parameter prediction device according to claim 5, wherein the target adjuster inputs the environmental characteristic quantity set as an independent variable to a third prediction model that predicts another evaluation value set, and adjusts the target evaluation value set using a predictive variance obtained by the prediction of the other evaluation value set.

7. A parameter prediction method, comprising:

acquiring an environmental characteristic quantity set, which quantifies one or more characteristics of a sound collection environment for an acoustic signal;

setting a target evaluation value set, which provides one or more values obtained by quantifying one or more performances of processing of the acoustic signal, or one or more evaluation values of a processed acoustic signal;

inputting the environmental characteristic quantity set and the target evaluation value set as independent variables to a first prediction model, and predicting a control parameter set for controlling acoustic signal processing;

generating a plurality of control parameter set candidates based on the control parameter set predicted by the first prediction model;

for each of the plurality of control parameter set candidates, inputting the environmental characteristic quantity set and the candidate as independent variables to a second prediction model, and predicting an evaluation value set; and selecting a control parameter set from the plurality of control parameter set candidates based on a plurality of evaluation value sets predicted, wherein at least one of the acquiring, the setting, and the predicting of the control parameter set, the generating, the predicting of the evaluation value set, and selecting is executed by a processor.

8. A non-transitory computer-readable recording medium, storing a program that causes a computer to execute the parameter prediction method according to claim 7.

* * * * *